United States Patent Office 2,886,602
Patented May 12, 1959

2,886,602

PREPARATION OF NITRO-TERT.-BUTYL ALCOHOL AND NITRO-ISOBUTENE

Art C. McKinnis, Long Beach, Calif., assignor, by mesne assignments, to Collier Carbon and Chemical Corporation, a corporation of California No Drawing. Application October 14, 1955
Serial No. 540,631

9 Claims. (Cl. 260—632)

This invention relates to an improved method for preparing nitro-tert.-butyl alcohol (2 - methyl - 1 - nitro-2-propanol) and α-nitro-isobutene, and in particular concerns a method for preparing these compounds by direct nitration of tert.-butyl alcohol and/or isobutene with commercial nitric acid.

In U.S. Patent No. 2,472,550, Smith et al. teach that nitro-tert.-butyl alcohol is formed by reaction between isobutene and nitrogen tetroxide. For the most part, however, the reaction yields dinitro-isobutane and nitrotert.-butyl nitrate, and it cannot be regarded as a commercially practical means for obtaining the nitro-alcohol. It has also been reported that nitro-olefines are formed by reaction between olefines and concentrated (100%) nitric acid. Again, however, the reaction produces more by-products than the desired material.

I have now found that nitro-tert.-butyl alcohol and nitro-isobutene can advantageously be produced by reacting either tert.-butyl alcohol or isobutene, or a mixture comprising both, with less concentrated nitric acid under carefully controlled conditions of time, temperature and pressure. The nitro-tert.-butyl alcohol and nitroisobutene are formed simultaneously and in more or less equimolecular proportions, and the over-all conversion of reactant to these two products is relatively high. The mixed product can be employed as such in the manufacture of methyl methacrylate, or the components can readily be separated by conventional means for various uses in the arts. Also, the nitro-isobutene can readily be hydrated to form the nitro-alcohol product and the latter can readily be dehydrated to form the nitro-olefine. Consequently, by adding a conventional hydration or dehydration step, the process of the invention can be adapted to the production of either the nitro-alcohol or the nitro-olefine as the principal product.

In accordance with the process of the invention, isobutene or tert.-butyl alcohol, or a mixture comprising both, is treated with aqueous nitric acid of between about 30 and about 85 percent concentration at a reaction temperature above about 120° C., under superatmospheric pressure. In order to suppress oxidation and the formation of undesirable byproducts, it is preferred to employ a relatively high ratio of $C_4$ reactant to nitric acid, e.g., 2 to 20 moles of tert.-butyl alcohol or isobutene should be provided per mole of nitric acid. Separation of the unreacted $C_4$ reactant from the reaction product for re-use is readily accomplished by conventional distillation procedures. The reaction pressure should be sufficient to maintain all of the reactants in the liquid phase at the particular reaction temperature employed, and may advantageously be somewhat higher. Usually, it is preferred to operate at between about 200 and about 2000 p.s.i.g., such pressure being attained either autogenically or by pressuring the reaction vessel with an inert gas.

As stated, the reaction temperature may be as low as about 120° C., in which case the time required to complete the reaction will be of the order of 20–30 minutes. It is preferred, however, to employ somewhat higher temperatures, e.g., 150°–200° C., although the reaction temperature should of course not exceed the decomposition temperature of the reactants or the products. The reaction time varies inversely with the reaction temperature; when operating at about 150°–200° C., the reaction time is about 1–10 minutes and will be correspondingly shorter at higher reaction temperatures.

The reaction may be conducted batch-wise simply by charging the desired quantities of reactants into a suitable pressure vessel, and heating the vessel and contents at the desired reaction temperature until reaction is essentially complete. The elevated pressure may be attained autogenically or it may be applied from an exterior source. The vessel and contents are then quickly cooled, excess pressure is released, and the liquid reaction product is distilled or otherwise treated to separate the nitro-alcohol and nitro-olefine products separately or in admixture.

When operating on a commercial scale it is usually more convenient and economical to operate on a continuous basis. The continuous reactor may suitably comprise a coil capable of withstanding the pressures involved and mounted in a furnace or salt bath heater. The $C_4$ and nitric acid reactants are passed through such coil under pressure at such a rate that the transit time through the coil corresponds to the reaction time at the reaction temperature employed. The effluent from the heated coil is cooled (if desired by indirect heat exchange against either or both of the reactants) and is then passed through a pressure relief valve into a continuous fractional distillation column. The latter is operated to produce an overhead fraction comprising unreacted $C_4$ reactant, water, and possibly a small quantity of nitric acid and/ or nitrogen oxides, one or more middle fractions comprising the nitro-alcohol and nitro-olefine, and a small bottoms fraction consisting of by-products. The overhead fraction is sent to a settling drum, and the organic layer is separated from the water and recycled back to the reactor.

The following examples will illustrate several ways in which the principle of the invention has been applied, but are not to be construed as limiting the invention.

*Example I*

Twelve parts by volume of 70% aqueous nitric acid and 120 parts by volume of tert.-butyl alcohol were charged to a glass-lined pressure vessel, and the latter was then pressured up to about 600 p.s.i.g. with nitrogen. The vessel and contents were then heated to 130° C. over a period of 15 minutes, held at this temperature for about 10 minutes, and then allowed to cool. The vessel was vented and the contents were steam distilled to obtain α-nitro-isobutene in about 38% yield. The bottoms fraction was then distilled under vacuum, whereby there was obtained an aqueous forerun, nitro-tert.-butyl alcohol in an amount corresponding to a yield of 32%, and a small bottoms fraction. The over-all yield of the two desired products was thus about 70%, and the two products were formed in substantially equimolecular proportions.

*Example II*

Two hundred parts by volume of isobutene and 22 parts by volume of 70% nitric acid were charged to a glass-lined pressure vessel and heated under autogenic pressure at about 55° C. for 1 hour. The temperature was then increased to about 120° C. and held at this value for 1 hour. The vessel was vented and the contents removed and steam-distilled at about 130 mm. pressure to obtain α-nitro-isobutene and nitro-tert.-butyl alcohol.

Other modes of applying the principle of my invention may be employed instead of those explained, change being made as regards the method or materials employed, provided the step or steps stated by any of the following claims, or the equivalent of such stated step or steps, be employed.

I, therefore, particularly point out and distinctly claim as my invention:

1. The method of preparing a mixture of nitro-tert.-butyl alcohol and α-nitro-isobutene which comprises reacting an organic compound selected from the class consisting of tert.-butyl alcohol, isobutene, and mixtures thereof with aqueous nitric acid at a temperature above about 120° C. but below the decomposition temperature of said products and said reactants, and under a pressure sufficient to maintain the said reactants in the liquid phase, the concentration of said aqueous nitric acid being between about 30 and about 85 percent by weight.

2. The method of claim 1 wherein between about 2 and about 20 moles of the said organic compound are employed per mole of nitric acid.

3. The method of claim 1 wherein the reaction temperature is maintained between about 120° C. and about 200° C. and the reaction time is between about 1 and about 30 minutes.

4. The method of claim 1 wherein the said organic compound is tert.-butyl alcohol.

5. The method of claim 1 wherein the said organic compound is isobutene.

6. The process which comprises heating aqueous nitric acid of between about 30 and about 85 percent by weight concentration with between about 2 and about 20 molecular equivalents of an organic material selected from the class consisting of tert.-butyl alcohol, isobutene, and mixtures thereof at a temperature between about 150° C. and about 200° C. and under sufficient pressure to maintain the said reactants in the liquid phase, and thereafter separating nitro-tert.-butyl alcohol and α-nitro-isobutene from the reaction product so formed.

7. The process of claim 6 wherein the reaction is effected under autogenic pressure.

8. The process of claim 6 wherein the reaction time is between about 1 and about 10 minutes.

9. The process of claim 6 wherein the reaction pressure is between about 200 and about 2000 p.s.i.g.

References Cited in the file of this patent
UNITED STATES PATENTS

| | | |
|---|---|---|
| 1,967,667 | Hass et al. | July 24, 1934 |
| 2,425,367 | Denton et al. | Aug. 12, 1947 |
| 2,472,550 | Smith et al. | June 7, 1949 |
| 2,654,788 | Marshall | Oct. 6, 1953 |